UNITED STATES PATENT OFFICE.

ADDISON F. HOFFMAN, OF PITTSBURGH, PENNSYLVANIA.

PROCESS OF TREATING MINE-WATER AND PRODUCT THEREOF.

1,315,836. Specification of Letters Patent. Patented Sept. 9, 1919.

No Drawing. Application filed December 10, 1917. Serial No. 206,396.

*To all whom it may concern:*

Be it known that I, ADDISON F. HOFFMAN, a citizen of the United States, residing at Pittsburgh, in the county of Allegheny and State of Pennsylvania, have invented new and useful Improvements in Processes of Treating Mine-Water and Products Thereof, of which the following is a specification.

The present invention relates to the treatment of mine water, with the production of materials suitable for use as a gas purifying agent as a by-product.

Mine water of the kinds herein referred to, as occurring in the Pittsburgh district, consists principally of a weak solution containing sulfuric acid and containing a relatively small proportion of ferric sulfate and other sulfates, but usually does not contain any material amount of ferrous sulfate. No ordinary mine water would contain as much as one per cent. of iron, and most of the mine waters will contain not over 0.2% Fe.

Since the iron is usually nearly all in the ferric state, it is not necessary to oxidize the solution, before the chemical treatment to be described below. In addition to the sulfates, it usually contains varying amounts of organic matter, which seems to possess valuable catalyzing properties. The sulfuric acid present varies from about zero up to as high as about two per cent., although in most waters nothing approaching the latter figure would be present. In most mine waters of the district mentioned, the amount of acid is much less than 0.2%, and usually less than 0.1%.

In the process of my present invention I preferably treat the mine water first with a sufficient quantity of pulverized calcium carbonate (*e. g.* chalk or marble) to neutralize the entire amount of free acid therein together with a sufficient excess over such amount, to react with the ferric sulfate present therein, and whatever aluminum sulfate may be present, to convert at least the major portion of these sulfates into the corresponding hydroxids. Great care should be taken, not to add to the mine water at this stage, such an amount of calcium carbonate as would cause the production of any considerable quantities of precipitated calcium sulfate. The addition of calcium carbonate may take place in one or several steps, and in case it is desired, other water substantially free from material quantities of sulfate or sulfuric acid may be added to the mine water, prior to or subsequent to or with the calcium carbonate additions.

It is not necessary to employ the basic material in the exact proportions necessary for conversion of all of the ferric compounds into hydroxid, and in practice it is found convenient to produce a precipitate containing large quantities of ferric hydroxid and small quantities of basic ferric sulfate, which product is highly suitable for use as a gas purifying material.

The alkaline material employed may be calcium carbonate as above stated, or magnesium carbonate, such as magnesite, or dolomitic limestone, or other alkali, and is preferably employed in the form of a powder, most of which will pass through a screen of 60 meshes, although the invention is not limited to the particular degree of fineness mentioned. The alkaline material is preferably not employed in the form of large pieces, since such large pieces would quickly become coated with a film or layer of ferric hydroxid, which would suspend action, and moreover there would be a much greater tendency to the formation and inclusion of calcium sulfate in the precipitate.

In accordance with the present invention, I do not aim to decompose the small amounts of ferrous sulfate which are ordinarily present in mine water, which ferrous sulfate is not particularly harmful to the water of rivers and so on, in the amounts existing in ordinary mine water. The calcium carbonate or other alkaline material above referred to, will not ordinarily react, under the conditions specified, with the ferrous sulfate content.

The ferrous sulfate content of mine waters of the class contemplated is usually so small as to be neglected, and it accordingly is not necessary to pay any attention to the ferrous sulfate content of the mine water, since this will not be precipitated nor altered during the process. It is only the ferric portion of the iron content which is altered during the process.

Prior to neutralization of the mine water, the ferric iron content thereof may be increased if desired, and the acid partially neutralized, by treating the mine water first with flue dust from blast furnaces, containing large amounts of ferric oxid, or by treating the mine water with ores or waste products containing considerable amounts of ferric oxid or hydrated ferric oxid. The production of gas purifying material also may be increased by the use of alkaline material containing relatively large quantities of iron.

The mine water and the alkaline material are thoroughly mixed together, by passing the same together into a suitable agitator or mixer, and the precipitate can be readily separated from the remaining water by sedimentation, after which the sludge, containing considerable water, may be passed to a drier and dried during which operation it is preferable not to heat the material to a temperature of much above 105° C.

The material after drying is then suitable for use as a gas purifying material, particularly for the removal of sulfur compounds from gas in a manner understood in the art.

An analysis of a typical sample of this material gave the following results, although of course this analysis is given merely for the purpose of illustration and not as limiting the invention thereto:

| | |
|---|---|
| $H_2O$ | 31.4 |
| $SiO_2$ | 6.1 |
| $Al_2O_3$ | 3.9 |
| $SO_3$ | 12.0 |
| $Fe_2O_3$ | 41.6 |
| Organic matter | 1.1 |
| $CaOMgOP_2O_5$ and undetermined | 3.9 |
| Total | 100.0 |

In this particular instance, the water content as given in the analysis includes both the water of constitution of the ferric hydrate and the mechanical water, the latter being in this instance considerably larger than the former. The $Fe_2O_3$ as given in the analysis includes the $Fe_2O_3$ content of the basic sulfate and $Fe_2O_3$ content of the ferric hydroxid. The latter in this example is over double the former. The silica, alumina, organic matter and calcium-magnesium phosphates constitute impurities in the product which are derived from naturally occurring impurities in the mine water, and do not injuriously affect the use of the product as a gas purifying agent, and moreover these impurities, and also the basic ferric sulfate content of the precipitate may in some instances catalytically increase the activity of the gas purifying material.

It will be understood that the relative proportions of basic ferric sulfate and the ferric hydroxid will vary depending upon the exact amount of alkaline material added. The silica, alumina, organic material and calcium-magnesium phosphates occurring in the product will vary considerably, depending upon the exact composition of the particular mine water treated, and of the alkaline material employed.

What I claim is:—

1. A process of treating mine water and other similar liquids, containing ferric sulfate and free sulfuric acid, and smaller amounts of other materials, which consists exclusively of the steps of adding an alkaline material thereto, in amount only sufficient to convert the major proportion of the ferric sulfate content thereof into ferric hydroxid and to convert the remainder of the soluble iron compounds into basic sulfate, separating the precipitate containing ferric hydroxid and basic ferric sulfate from the treated mine water, and drying the latter at a temperature too low to remove the water of constitution of the ferric hydroxid, and without calcining the precipitate.

2. Gas purifying material produced from mine water, said product comprising as its essential constituents, ferric hydroxid in large amounts, basic ferric sulfate in small amounts, together with small amounts of naturally occurring components of the mine water.

3. A process of treating mine water and other similar liquids, containing ferric sulfate and free sulfuric acid, and smaller amounts of other materials, which consists exclusively of the steps of adding an alkaline material thereto, in amount only sufficient to convert the major proportion of the ferric sulfate content thereof into ferric hydroxid, and to convert the remainder of the soluble iron compounds into basic ferric sulfate, separating the precipitate containing ferric hydroxid and basic ferric sulfate from the treated mine water, and drying the latter at a temperature not above about 105° C., and without calcining the precipitate.

In testimony whereof, I have hereunto subscribed my name this 7th day of December, 1917.

ADDISON F. HOFFMAN.

Witness:
  Jno. S. Green.